(12) United States Patent
Hirooka et al.

(10) Patent No.: US 8,074,571 B2
(45) Date of Patent: Dec. 13, 2011

(54) APPARATUS INCLUDING IGNITER

(75) Inventors: Masato Hirooka, Tatsuno (JP); Mikio Yabuta, Tatsuno (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 11/747,702

(22) Filed: May 11, 2007

(65) Prior Publication Data

US 2008/0042411 A1 Feb. 21, 2008

Related U.S. Application Data

(60) Provisional application No. 60/809,792, filed on Jun. 1, 2006.

(30) Foreign Application Priority Data

May 26, 2006 (JP) ................................. 2006-146096

(51) Int. Cl.
*F42C 11/00* (2006.01)

(52) U.S. Cl. ............. 102/202.14; 102/202.5; 102/202.9; 102/530

(58) Field of Classification Search .................. 102/530, 102/202.9, 202.5, 202.7, 202.14
See application file for complete search history.

(56) References Cited

U.S. PATENT DOCUMENTS

| | | | | |
|---|---|---|---|---|
| 4,621,578 A * | 11/1986 | Vallieres et al. | ............ | 102/202.9 |
| 4,696,231 A * | 9/1987 | Bryan | ........................ | 102/202.5 |
| 5,639,986 A | 6/1997 | Evans | | |
| 6,164,208 A * | 12/2000 | Hsu et al. | ................... | 102/202.5 |
| 6,718,884 B1 * | 4/2004 | Yabuta et al. | ................. | 102/530 |
| 7,370,885 B2 * | 5/2008 | Stevens | ......................... | 280/741 |
| 2002/0189487 A1* | 12/2002 | Kubo et al. | ................... | 102/530 |
| 2004/0232679 A1* | 11/2004 | Kubo et al. | ................... | 280/741 |
| 2005/0189753 A1* | 9/2005 | Kato et al. | ...................... | 280/741 |

FOREIGN PATENT DOCUMENTS

| | | |
|---|---|---|
| EP | 0997356 A2 | 5/2000 |
| EP | 1 236 624 A1 | 9/2002 |
| EP | 1 329 365 A1 | 7/2003 |
| EP | 1 454 803 A1 | 9/2004 |
| EP | 1 659 036 A1 | 5/2006 |
| FR | 2 876 968 A1 | 4/2006 |

* cited by examiner

*Primary Examiner* — Michael Carone
*Assistant Examiner* — Daniel Troy
(74) *Attorney, Agent, or Firm* — Birch, Stewart, Kolasch & Birch, LLP (57) ABSTRACT

An apparatus including and igniter comprises:
  an igniter,
  an igniter collar for fixing the igniter,
  a cylindrical housing forming an outer shell,
  the igniter collar and the cylindrical housing being assembled by laminating a wall surface at one end of the igniter collar to a wall surface at one end of the cylindrical housing in the thickness direction, and being fixed to each other by crimping from the outside the laminated part thereof, wherein igniter collar and the cylindrical housing are laminated,
  an outer diameter of the laminated part being within ±10% of a reference outer diameter when an outer diameter of at least one of the igniter collar and cylindrical housing is the reference outer diameter,
  a thickness ($h_2$) of an inner layer in the crimped laminated part being 1.5 times or more than a crimping depth ($h_1$).

6 Claims, 6 Drawing Sheets

APPARATUS INCLUDING IGNITER

This nonprofessional application claims priority under 35 U.S.C. §119(a) on Patent Application No. 2006-146096 filed in Japan on 26 May 2006, and 35 U.S.C. §119(e) on U.S. Provisional Application No. 60/809,792 filed on 1 Jun. 2006, which are incorporated by reference.

BACKGROUND OF INVENTION

1. Field of Invention

The present invention relates to an apparatus, including an igniter, that can be used in an inflator or the like for use in a human body restraining device of a vehicle.

2. Description of Related Art

Igniters have been used in inflators for airbags and also in inflators or actuators for use in passenger restraining devices for vehicles and in pedestrian protection devices. From the standpoint of reducing the size of the entire apparatus, it is preferred that the attachment portion of the igniter be miniaturized.

Because an igniter generates a shock wave and combustion gas, when the igniter is disposed inside a sealed container, the wall thickness of the container has to be increased to ensure pressure resistance of the container, and when the igniter is fixed to the container, the igniter has to be fixed so as not to be detached from the container by the actuation pressure. This is one of the reasons why the fixing portion of the igniter is made bulky and the size of the inflator or actuator is increased.

In a gas generator disclosed in EP-A2 No. 0 997 356, an igniter 7 is attached to a blocking member 11 that blocks one end of a cylindrical member 15 in the combustion chamber 3 side. The igniter 7 is fixed to the blocking member 11 by crimping, and the cylindrical member 15 is crimped in a state in which it abuts against the outer peripheral surface of the blocking member 11.

SUMMARY OF INVENTION

The present invention provides an apparatus including an igniter, including:

an igniter, an igniter collar for fixing the igniter, a cylindrical housing forming an outer shell, the igniter collar and the cylindrical housing being assembled by laminating a wall surface at one end of the igniter collar to a wall surface at one end of the cylindrical housing in the thickness direction, and being fixed to each other by crimping from the outside the laminated part thereof, wherein igniter collar and the cylindrical housing are laminated, an outer diameter of the laminated part being within ±10% of a reference outer diameter when an outer diameter of at least one of the igniter collar and cylindrical housing is the reference outer diameter, a thickness ($h_2$) of an inner layer in the crimped laminated part being 1.5 times or more a the crimping depth ($h_1$).

BRIEF DESCRIPTION OF DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

In order to perform fixing by crimping in EP-A2 No. 0 997 356, a protruding section that protrudes inwardly is formed at the end portion of the cylindrical member 15, and a connection concave portion of an external connector is formed in the blocking member 11. When fixing to the cylindrical member 15 is performed, a thickness between the outer peripheral surface and the concave connecting section of the blocking member 11 has to be maintained and fixing strength has to be raised by increasing the depth of the crimping portion, and the crimping has to be prevented from affecting the shape of the connection concave section. For this purpose the outer diameter of the blocking member 11 has to be increased. For example, if the thickness of the crimping portion is small, the depth of the crimping portion decreases and a sufficient fixing strength cannot be obtained. Furthermore, when the crimping is performed from the outside, a concave connection section can be formed too easily so that a connector cannot be connected. Furthermore, it is difficult to fix the blocking member, with a sufficient strength, to the cylindrical member 15 and the blocking member 11 easily comes off by combustion pressure or the like.

Accordingly it is necessary to increase the thickness of the crimping portion. Furthermore, the end portion of the cylindrical member 15 is inserted into the outer side of the crimping portion. As a result, the outer diameter of the entire gas generator is increased.

In the present invention, "laminate" means "overlap", "superpose", "superimpose", or "stack". Hereinafter, "laminate" will be used.

The present invention provides an apparatus including an igniter in which a fixing structure including an igniter collar in an attachment portion of the igniter is improved, whereby the entire apparatus can be reduced in size and can be used as an inflator in an occupant restraining device of a vehicle or the like.

The "apparatus including an igniter" as referred to herein is an apparatus including an igniter as a structural element. Examples of such apparatuses include various inflators (hybrid inflators, pyrotechnic inflator, and the like) for use in occupant restraining devices (airbag apparatuses and the like) for vehicles, and various actuators and gas generators for use in human body restraining apparatuses, other than the airbag apparatuses (an apparatus for raising a hood of a vehicle during collision with the object of protecting a pedestrian, an apparatus for pulling a steering wheel forward in a vehicle, and the like).

The igniter has an ignition portion and a retention portion. The ignition portion includes an ignition agent, a bridge wire, an electroconductive pin, a header that supports the electroconductive pin, and a cup for holding the ignition agent. The retention portion is formed from a resin or the like and envelopes at least part of the outer peripheral surface of the ignition portion. The retention portion is a member serving to fix the ignition portion.

The igniter collar is a substantially cylindrical member that is open at both ends thereof. The igniter collar is made from a metal or the like. A space (concave portion) for connecting a connector is formed in an open portion at one end of the igniter collar.

The cylindrical housing may be composed entirely of a single housing or be an assembly of two or more housings. For example, when the apparatus including an igniter is a hybrid inflator, a pressurized gas chamber housing that is filled with a pressurized gas and a combustion chamber housing that is filled with a gas generating agent may be prepared separately and integrated by welding to obtain a single housing unit. No specific limitation is placed on the cross-sectional shape of the housing in the width direction, provided that is can be connected to the igniter collar. Thus, it can have a round, elliptical or polygonal shape. No specific limitation is place on the shape of the housing in the axial direction and the housing can have not only a generally cylindrical shape, by also an L-like shape.

As for the assembly of the igniter collar and the cylindrical housing, the wall surfaces thereof can be laminated in the thickness direction by inserting an end portion (inner layer) of the cylindrical housing into an end portion (outer layer) of the igniter collar, or the wall surfaces can be laminated in the thickness direction by inserting one end (inner layer) of the igniter collar into one end (outer layer) of the cylindrical housing. No specific limitation is placed on the length of the laminated part, and this length is determined by the relationship with the total length of the apparatus or fixing strength.

The thickness of the laminated part can be adjusted by changing the thickness of the wall surface of one end portion of the igniter collar or the thickness of the wall surface of one end portion of the cylindrical housing, but the outer diameter of the laminated part is within ±10% (preferably within ±8%) of a reference outer diameter, where either or both of an outer diameter of the igniter collar and an outer diameter of the cylindrical housing are taken as the reference outer diameter. When both the outer diameter of the igniter collar and the outer diameter of the cylindrical housing are taken as the reference outer diameter, it means that the two outer diameters are equal to each other.

Here, 0% means that the outer diameter of the laminated part is equal to the outer diameter of at least one from among the igniter collar and the cylindrical housing. When the outer diameter of the laminated part is equal to both the outer diameter of the igniter collar and the outer diameter of the cylindrical housing, the outer surface of the entire body becomes flush with each other (a state without a step). If the outer surface is flush, the outer diameter can be decreased. This is preferable because an operation of mounting the apparatus in a restricted installation space is facilitated by comparison with that in the case where a step is present at the outer surface.

The igniter collar and the cylindrical housing are crimped from the outside in the laminated part, and the thickness of the inner layer (end portion of the igniter collar or end portion of the cylindrical housing) of the crimped laminated part is preferably 1.5 or more times (preferably 2 or more times, even more preferably 3 or more times) the crimping depth.

An example of a fixing method by crimping is a method of crimping an outer layer (for example, pressing and indenting to obtain a form matching that of the annular groove) that is directly opposite the annular groove (continuous or discontinuous groove) formed in advance in the circumferential direction in the inner layer. If the thickness of the inner layer at this time is sufficiently larger than the crimping depth (essentially, becomes the depth of the annular groove), the fixing strength effected by crimping the outer layer can be increased by increasing the depth of the annular groove. Furthermore, even when the depth of the annular groove is increased, no protrusion is formed at the inner surface side.

The present invention further provides the apparatus including an igniter, wherein the igniter has an ignition portion and a retention portion that envelopes at least part of the outer peripheral surface of the ignition portion, and the retention portion is fixed by both the igniter collar and the cylindrical housing.

By fixing the igniter by both the igniter collar and the cylindrical housing, it is possible to use the laminated part of the igniter collar and the cylindrical housing. Therefore, connecting the igniter collar with the housing and fixing the igniter can be performed by a single operation. In addition, the size of the entire apparatus in the lengthwise direction can be reduced. The cylindrical housing as referred to herein is, for example, a combustion chamber housing in the case of a hybrid inflator including the pressurized gas chamber housing and the combustion chamber housing.

The present invention further provides the apparatus, wherein the igniter has an ignition portion and a retention portion that envelopes at least part of an outer peripheral surface of the ignition portion, the retention portion of the igniter has a larger-diameter portion that is positioned in the central section in the lengthwise direction or in the vicinity thereof and a smaller-diameter portion that has an outer diameter smaller than that of the larger-diameter portion and is positioned in at least one end section in the lengthwise direction, and the outer diameter of the larger-diameter portion is larger than that of the outer diameter of the ignition portion, and the crimping portion is in a position that is not opposite to the larger-diameter portion in the radial direction.

The outer shape of the retention portion can vary depending on the type of the igniter. In the case of an igniter having a retention portion including the above-described larger-diameter portion and smaller-diameter portion (in some cases, two smaller-diameter portions are provided at both ends), the thickness of the wall surface facing the larger-diameter portion in the radial direction decreases. Therefore, in the wall surface outside this wall surface, the crimping is performed from the outside.

The present invention further provides the apparatus, wherein the cylindrical housing functions as a guide for controlling a release direction of combustion products generated from an ignition portion of the igniter.

By using the housing that forms an igniter accommodation portion as a guide for controlling a release direction of combustion products, the operation is improved.

In the apparatus including an igniter in accordance with the present invention, the fixing structure of the portion including the igniter is improved, whereby the fixing strength is increased and the entire apparatus is reduced in size.

Figure 1:
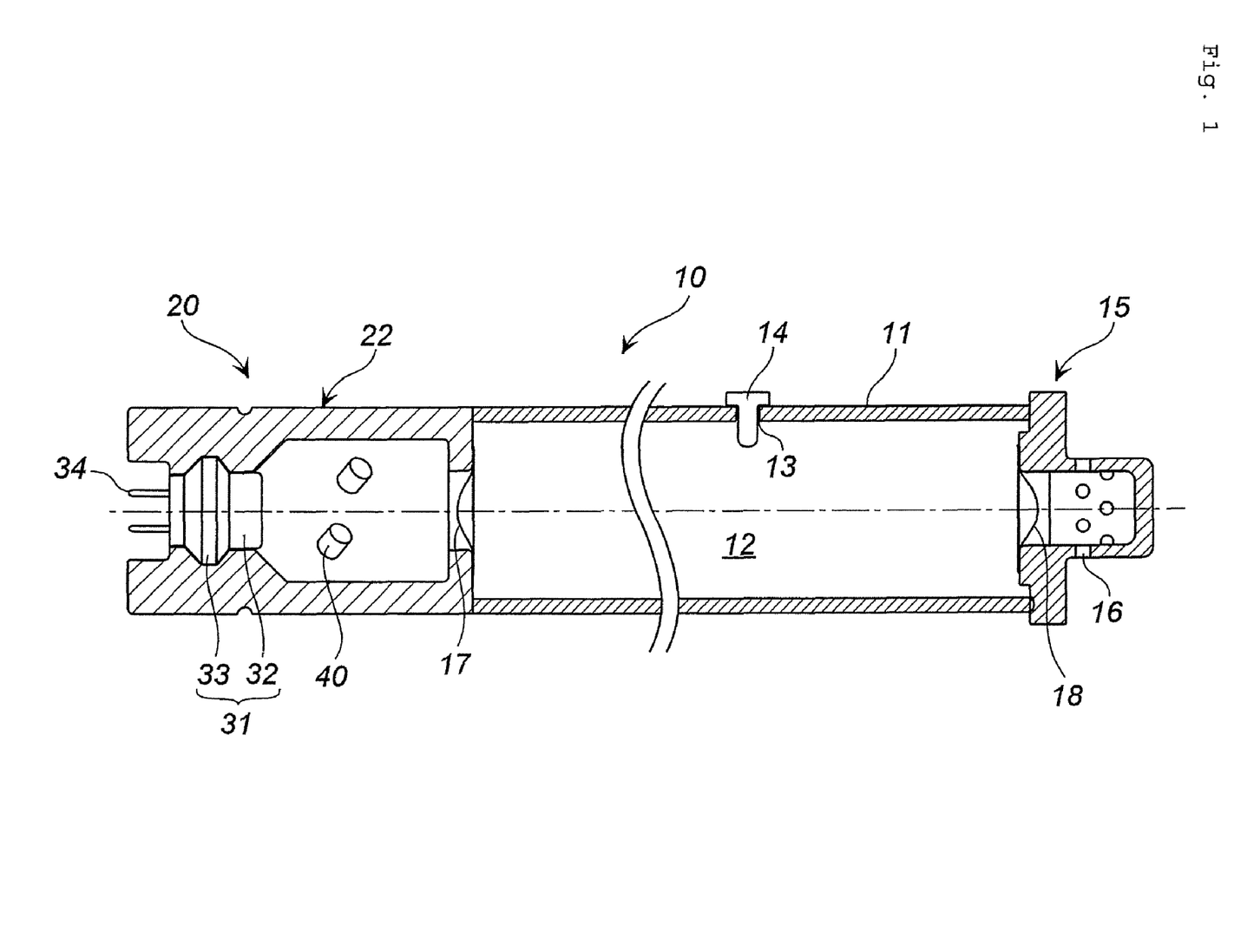
FIG. 1 shows a longitudinal sectional view of the apparatus (hybrid inflator) in accordance with the present invention.
Figure 2:
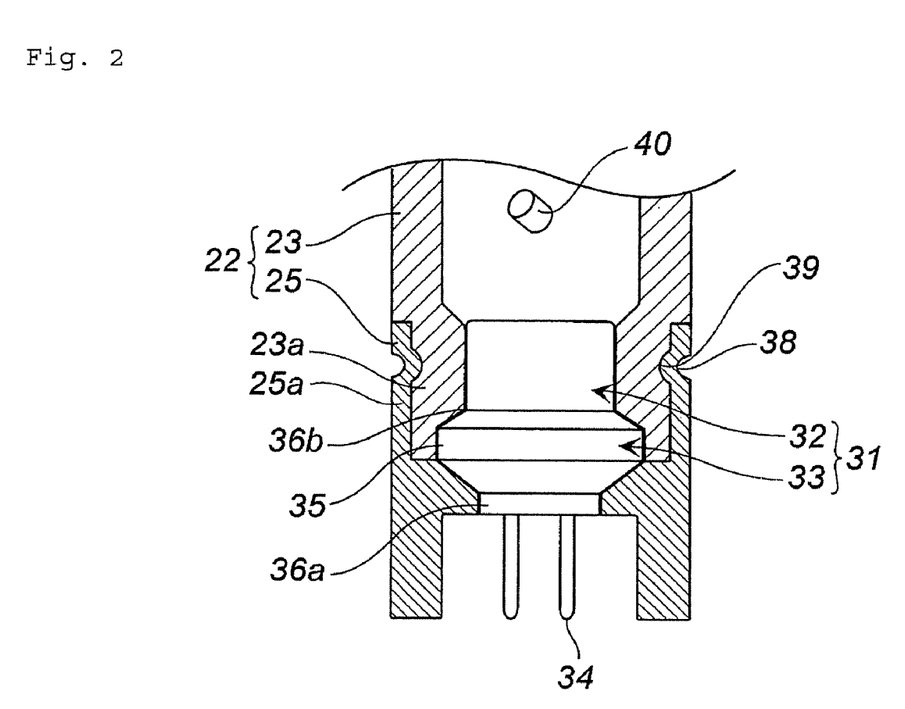
FIG. 2 shows a partial view of the configuration shown in FIG. 1.
Figure 3:
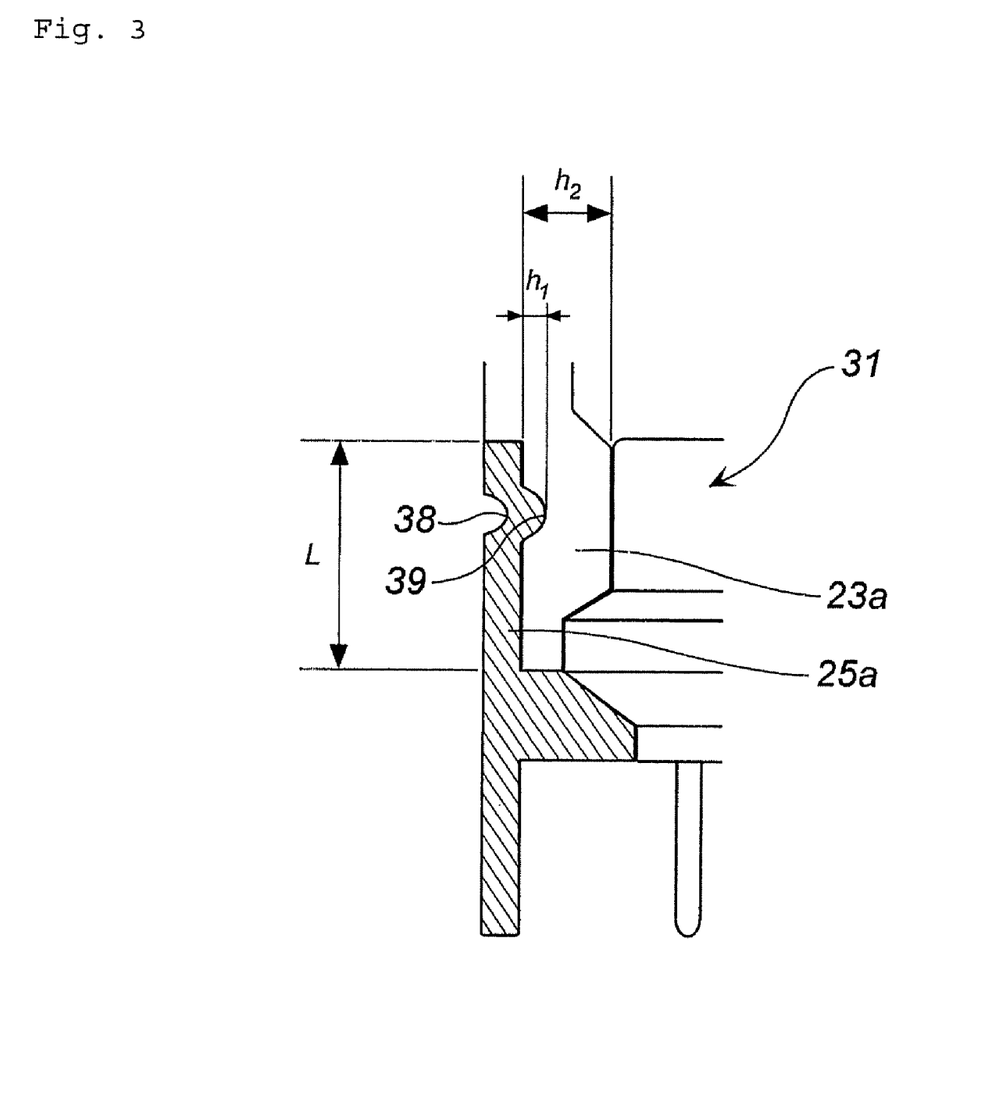
FIG. 3 shows a partial enlarged view of the configuration shown in FIG. 2.

EMBODIMENTS OF INVENTION (1) Apparatus Shown in FIGS. 1 to 3

FIG. 1 is a longitudinal sectional view of a hybrid inflator relating to the case where a hybrid inflator for an airbag is an apparatus, in accordance with the present invention, including an igniter. FIG. 2 is a partial view of the configuration shown in FIG. 1, and FIG. 3 is a partial enlarged view of the configuration shown in FIG. 2

An inflator 10 has a pressurized gas chamber 12, a diffuser portion 15, and a gas generator 20.

In the pressurized gas chamber 12, an outer shell is formed by a cylindrical pressurized gas chamber housing 11, and the space between a first rupturable plate 17 and a second rupturable plate 18 is filled with a single gas such as argon, helium, or a mixture thereof in a pressurized state (30,000 to 67,000 kPa). Therefore, the pressure inside the diffuser portion 15 and a gas generator housing 22 is equal to ambient (atmospheric) pressure.

The pressurized gas chamber housing 11 has a shape that is symmetrical in the axial direction and radial direction. A charging port 13 for the pressurized gas is formed in the side surface of the pressurized gas chamber housing 11, and this port is blocked with a pin 14 after the pressurized gas has been charged into the pressurized gas chamber housing.

A diffuser portion 15 having a gas discharge port 16 for discharging the pressurized gas and combustion gas is connected by resistance welding to one end of the pressurized gas chamber 12. If necessary, a filter of wire mesh or the like can be disposed inside the diffuser portion 15 to trap combustion residues.

The gas generator housing 22 that forms the outer shell of the gas generator 20 is connected by resistance welding to the other end of the pressurized gas chamber 12. The gas generator housing 22 is obtained by assembling and integrating a combustion chamber housing 23 and an igniter collar 25. The inside of the gas generator housing is filled with a solid gas generating agent 40, and an igniter 31 is accommodated and fixed in the open portion. The inner shape of the space where the igniter 31 is accommodated matches the outer shape of the ignition portion 32 and the retention portion 33 of the igniter 31, and the igniter 31 comes into contact with the inner surface of the accommodation space. A gap may be present between the inner surface of the accommodation space and the outer surface (circumferential surface) of the ignition portion 32.

The igniter 31 is a well-known electric igniter of a type that has been generally used in gas generators for airbags. The igniter has the ignition portion 32, a retention portion 33 made from a synthetic resin and enclosing the outer peripheral surface of the ignition portion 32, and two electroconductive pins 34. The electroconductive pins 34 are connected to a connector and supplied with an ignition current.

The retention portion 33 of the igniter 31 has a larger-diameter portion 35 that is positioned in the central portion in the lengthwise direction and a first smaller-diameter portion 36a and a second smaller-diameter portion 36b that are positioned at both ends in the longitudinal direction. The outer diameter of the larger-diameter portion 35 is larger than the outer diameters of the first smaller-diameter portion 36a and the second smaller-diameter portion 36b. Annular slanted surfaces are formed between the larger-diameter portion 35 and the two smaller-diameter portions, that is, the first smaller-diameter portion 36a and the second smaller-diameter portion 36b. In the igniter 31, the upper annular slanted surface comes into contact with one end portion of the combustion chamber housing 23, and the lower annular slanted surface comes into contact with the igniter collar 25, and thereby, the two annular slanted surfaces are squeezed by them and fixed.

In the combustion chamber housing 23 and the igniter collar 25, a cylindrical wall surface 23a (inner layer) at one end of the combustion chamber housing 23 is inserted into a cylindrical wall surface 25a (outer layer) at one end of the igniter collar 25, and the cylindrical wall surface 23a and the cylindrical wall surface 25a are laminated in the thickness direction. The outer diameter of the igniter collar 25 and the outer diameter of the combustion chamber housing 23 are equal to each other, except for the portions to be laminated.

Where the outer diameters of the combustion chamber housing 23 and the igniter collar 25 are taken as a reference outer diameter, the outer diameter of the part where the housing 23 and collar 25 are laminated is equal to the reference outer diameter, and the outer surface of the hybrid inflator 10 shown in FIG. 1, excluding the diffuser portion 15, is flush. Therefore, the outer diameter can be decreased. Further, because no step is present on the surface, the operation of attaching the hybrid inflator 10 in a limited and narrow attachment space inside a vehicle is facilitated.

The length of the laminated part (length indicated by "L" in FIG. 3) can be determined by the length of the hybrid inflator 10, the fixing strength of the combustion chamber housing 23 and the igniter collar 25 and so on. In the embodiment illustrated by FIG. 1, the length L of the laminated part can be set within a range of 15 to 30% the length of the igniter collar 25.

The combustion chamber housing 23 and the igniter collar 25 are fixed by crimping (forming a crimping portion 38) the cylindrical wall surface 25a (outer layer) of one end of the igniter collar 25, that is positioned directly opposite to the annular groove 39 in the thickness direction, against an annular groove 39 formed in advance continuously, in the circumferential direction, in the cylindrical wall surface 23a (inner layer) at one end of the combustion chamber housing 23.

The thickness $h_2$ of the cylindrical wall surface 23a (inner layer) located at one end of the combustion chamber housing 23 is about 3.7 times ($h_2/h_1$) the depth $h_1$ of the annular groove 39 (equal to the depth of the crimping portion 38).

Because the thickness $h_2$ of the cylindrical wall surface 23a (inner layer) is sufficiently large by comparison with the depth $h_1$ of the annular groove 39 (equal to the depth of the crimping portion 38), the fixing strength of the igniter collar 25 and the combustion chamber housing 23 is increased by making the annular groove 39 and the crimping portion 38 deeper. Furthermore, because no protrusion is formed at the inner surface of the cylindrical wall surface 23a (the surface that is in contact with the igniter 31) even though the annular groove 39 is deep, the operation of attaching the igniter 31 is not affected.

(Method for Assembling the Inflator 10 Shown in FIGS. 1 to 3)

The diffuser portion 15 having the second rupturable plate 18 attached thereto is joined by welding to the open portion at one end of the pressurized gas chamber housing 11. Then, the combustion chamber housing 23 having the first rupturable plate 17 attached thereto is joined by welding to the open portion at the other end of the pressurized gas chamber housing 11, followed by charging the predetermined quantity of the gas generating agent 40.

The igniter 31 is then fitted into the combustion chamber housing 23. Then, the cylindrical wall surface 25a of the igniter collar 25 is fitted into the cylindrical wall surface 23a of the combustion chamber housing 23, followed by crimping in the predetermined position (crimping portion 38), and the combustion chamber housing 23 and the igniter collar 25 are fixed in the crimping portion 38 and the annular groove 39. A gas such as argon and helium is thereafter pumped into the pressurized gas chamber 12. The operation of fixing the igniter 31 and the operation of fixing the igniter collar 25 to the combustion chamber housing 23 can thus be performed as a single operation.

(Operation of the Inflator 10 Shown in FIG. 1).

The case in which the inflator 10 shown in FIG. 1 is incorporated in an airbag system installed at an automobile will be described below. When an automobile collides and receives the impact, an actuation signal is received from a control unit (not shown in the drawing), and the igniter 31 is actuated and ignited, causing the combustion of the gas generating agent 40 and generating a high-temperature combustion gas. In this process, the cylindrical wall surface 23a of the gas generator housing 22 acts as a guide for controlling the discharge direction of the combustion products generated from the igniter 31.

If then the first rupturable plate 17 is fractured by the increase in pressure inside the gas generator 20 induced by the high-temperature combustion gas and the combustion gas flows into the pressurized gas chamber 12, the second rupturable plate 18 is fractured by the increase in pressure and the pressurized gas and combustion gas are discharged from the gas discharge port 16 and inflate the airbag.

Figure 4:
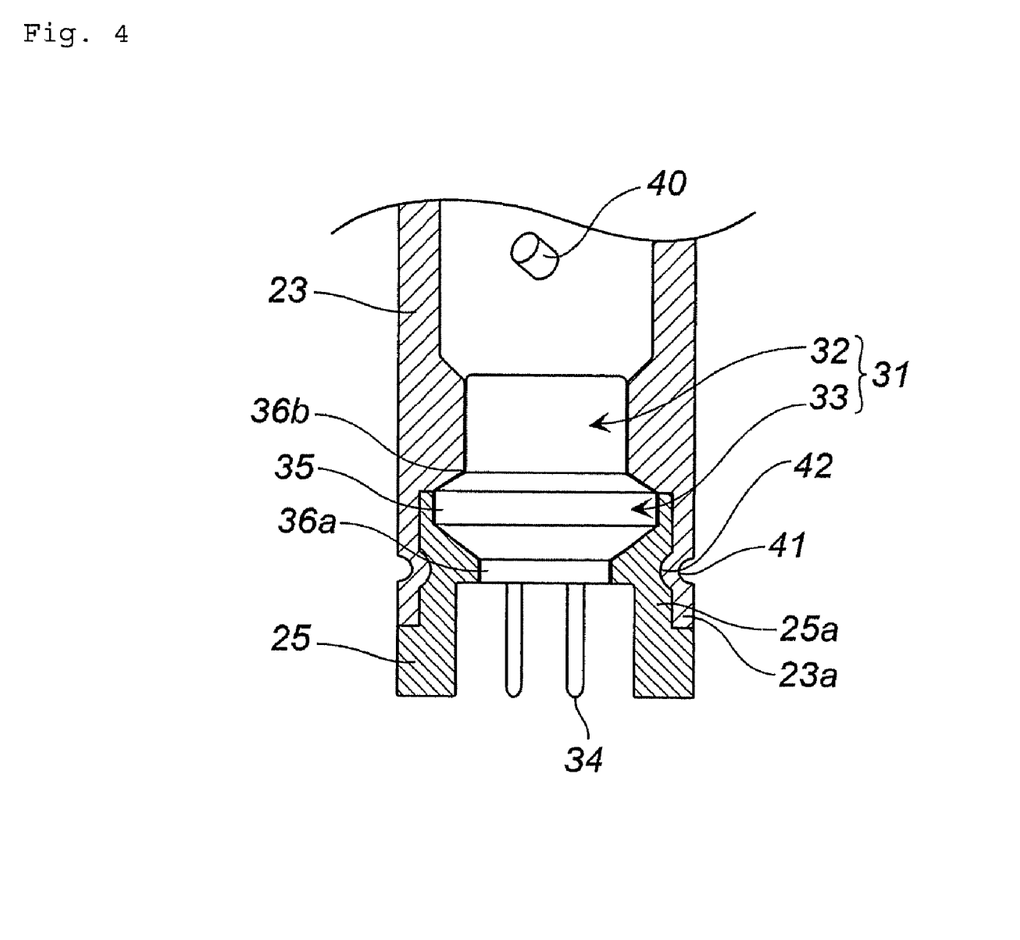
FIG. 4 shows a partial view of the inflator of an embodiment other than that shown in FIG. 1.

(2) Inflator Shown in FIG. 4

FIG. 4 is a partial view illustrating an embodiment other than the inflator 10 shown in FIG. 1. The inflator shown in FIG. 4 has a structure almost identical to that of the inflator 10 shown in FIGS. 1 to 3. Therefore, only different components will be explained below. Reference symbols identical to those shown in FIG. 1 denote identical constituent elements.

In the embodiment shown in FIG. 4, by contrast with the inflator shown in FIGS. 1 to 3, a cylindrical wall surface 25a (inner layer) located at one end of an igniter collar 25 is inserted into a cylindrical wall surface 23a (outer layer) located at one end of a combustion chamber housing 23, and the cylindrical wall surface 23a and the cylindrical wall surface 25a are laminated in the thickness direction. The igniter collar 25 and the combustion chamber housing 23 are fixed by a crimping portion 41 and an annular groove 42. The external surface is a plane, and the $h_2/h_1$ ratio is about 6.

Figure 5:
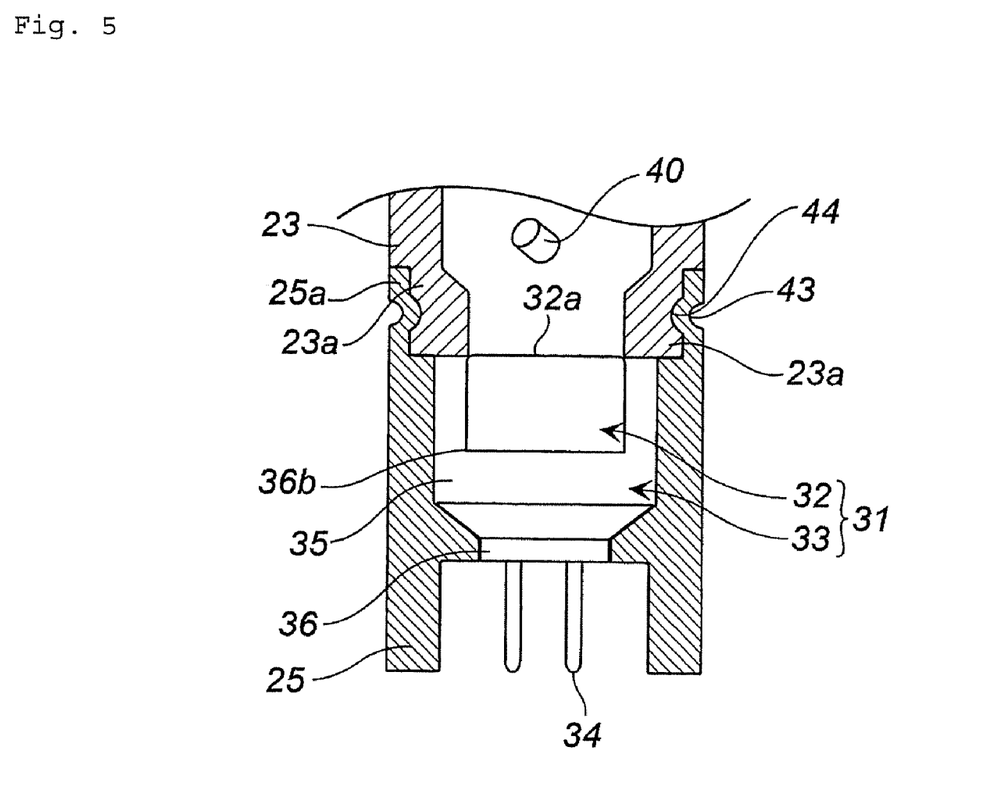
FIG. 5 shows a partial view of the inflator of an embodiment other than that shown in FIG. 1.

(3) Inflator Shown in FIG. 5

FIG. 5 is a partial view illustrating an embodiment other than the inflator 10 shown in FIG. 1. The inflator shown in FIG. 5 has a different attachment structure because the shape of an igniter 31 is different from that shown in FIGS. 1 to 3. Reference symbols identical to those shown in FIG. 1 denote identical constituent elements.

The igniter 31 includes an ignition portion 32 and a retention portion 33. The ignition portion 32 is retained in a state in which it is enveloped by the retention portion 33, and only the top surface 32a of the ignition portion is exposed. The retention portion 33 has a larger-diameter portion 35 and a smaller-diameter portion 36, and an annular slanted surface is formed between the larger-diameter portion 35 and the smaller-diameter portion 36.

In the embodiment shown in FIG. 5, similarly to the embodiment illustrated by FIGS. 1 to 3, a cylindrical wall surface 23a (inner layer) located at one end of a combustion chamber housing 23 is inserted into a cylindrical wall surface 25a (outer layer) located at one end of an igniter collar 25, and the cylindrical wall surface 23a and the cylindrical wall surface 25a are laminated in the thickness direction. The igniter collar 25 and the combustion chamber housing 23 are fixed by a crimping portion 43 and an annular groove 44. The external surface is a plane, and the $h_2/h_1$ ratio is about 6. The length L of the laminated part is less than that of the configurations shown in FIGS. 1 to 3 and FIG. 4. The igniter 31 is fixed by sandwiching the retention portion 33 between the combustion chamber housing 23 and the igniter collar 25.

Figure 6:
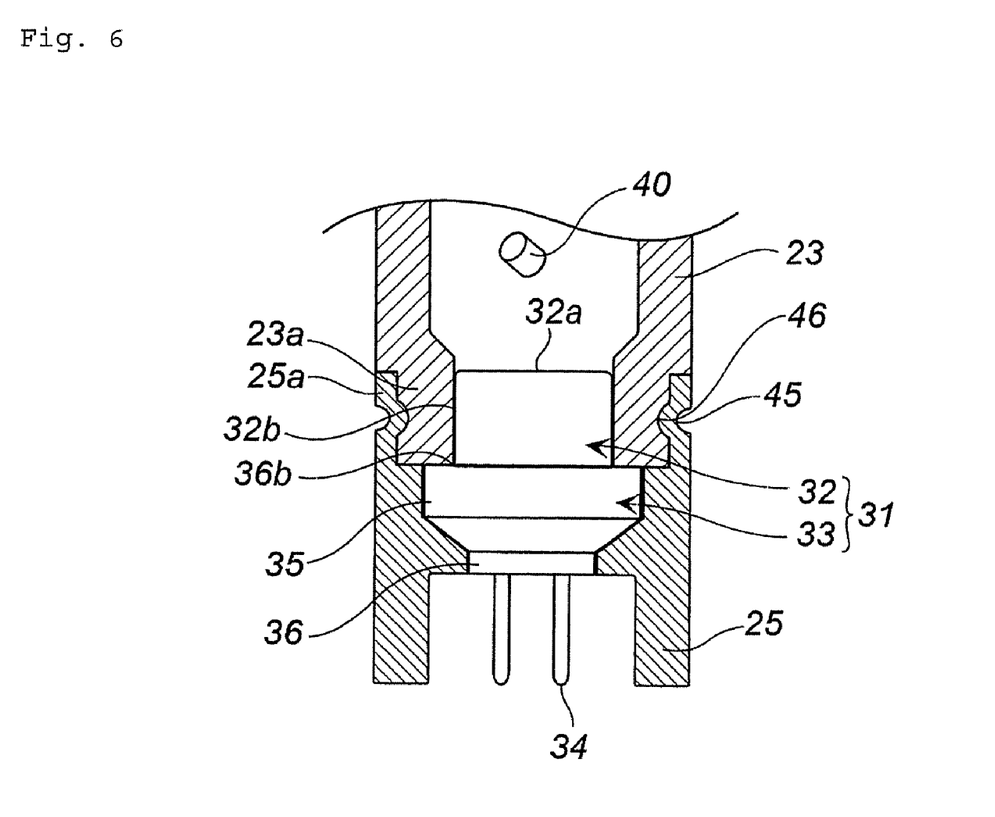
FIG. 6 shows a partial view of the inflator of an embodiment other than that shown in FIG. 1.

(4) Inflator Shown in FIG. 6

FIG. 6 is a partial view illustrating an embodiment other than the inflator 10 shown in FIG. 1. The inflator shown in FIG. 6 has a different attachment structure because the shape of an igniter 31 is different from that shown in FIGS. 1 to 3. Reference symbols identical to those shown in FIG. 1 denote identical constituent elements.

The igniter 31 includes an ignition portion 32 and a retention portion 33. The ignition portion 32 is not enveloped by the retention portion 33. Before the attachment, an top surface 32a and a circumferential surface 32b are exposed, but, as shown in FIG. 6, after the attachment, the circumferential surface 32b is enveloped by a cylindrical wall portion 23a of the combustion chamber housing 23, and only the top surface 32a is exposed. The retention portion 33 of the igniter 31 has a larger-diameter portion 35 and a smaller-diameter portion 36, and an annular slanted surface is formed between the larger-diameter portion 35 and the smaller-diameter portion 36.

In the embodiment shown in FIG. 6, similarly to the embodiment illustrated by FIGS. 1 to 3, a cylindrical wall surface 23a (inner layer) located at one end of a combustion chamber housing 23 is inserted into a cylindrical wall surface 25a (outer layer) located at one end of an igniter collar 25, and the cylindrical wall surface 23a and the cylindrical wall surface 25a are laminated in the thickness direction. The igniter collar 25 and the combustion chamber housing 23 are fixed by a crimping portion 45 and an annular groove 46. The external surface is a plane, and the $h_2/h_1$ ratio is about 4.5. The length L of the laminated part is less than that of the configurations shown in FIGS. 1 to 3 and FIG. 4. The igniter 31 is fixed by sandwiching the retention portion 33 between the combustion chamber housing 23 and the igniter collar 25.

In the above-described embodiments, the fixing structure in accordance with the present invention was explained by way of an example of application to an airbag inflator for a driver side, but it can be also applied to a variety of other inflators such as an airbag inflator for a passenger side, an inflator for a side air bag, an inflator for a curtain air bag, an inflator for a knee bolster, an inflator for an inflatable seat belt, an inflator for a tubular system, and an inflator for a pretensioner. Furthermore, such fixing structure can be also used in apparatuses including an igniter that are used in pyrotechnic actuators and pedestrian protection systems.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. An apparatus including an igniter, comprising:
   an igniter having an ignition portion and a retention portion that supports the ignition portion, the retention portion including,
      a larger-diameter portion having a diameter larger than a diameter of the ignition portion,
      an upper retention surface provided in an upper portion of the igniter with regard to a lengthwise direction of the retention portion and connecting the ignition portion and the larger-diameter portion, and
      a lower retention surface provided in a lower portion of the igniter with regard to the lengthwise direction of the retention portion and connecting the lower end of the igniter and the larger-diameter portion;
   a cylindrical housing forming an outer shell and including an inwardly extending portion, provided at a vicinity of one end thereof, that extends in an inward direction toward the ignition portion; and
   an igniter collar that supports at least the retention portion of the igniter, the igniter collar including,
      a reduced outer diameter portion, a larger outer diameter portion having an outer diameter larger than a diameter of the reduced outer diameter portion, an inwardly projecting portion provided in an inner surface of the igniter collar, corresponding to the reduced outer diameter portion, and a groove formed in the reduced outer diameter portion at a position corresponding to the inwardly projecting portion, the igniter collar being attached to the cylindrical housing by overlapping a wall surface of the reduced outer diameter portion of the igniter collar and a wall surface of the cylindrical housing in a thickness direction to form an overlapping part, such that the inwardly extending portion opposes and makes contact with the upper retention surface of the retention portion and the inwardly projecting portion makes contact with the lower retention surface; and an outer circumference of the cylindrical housing being provided with a crimp at a position corresponding to the groove.

2. The apparatus according to claim 1, wherein
the crimp is provided so as to offset from the larger-diameter portion in the lengthwise direction.

3. The apparatus according to claim 1, wherein the cylindrical housing guides combustion products generated from the ignition portion of the igniter in a predetermined release direction.

4. The apparatus according to claim 1, wherein
the cylindrical housing has a substantially constant outer diameter and a larger inner diameter portion, that overlaps with the reduced outer diameter portion of the igniter collar, and a diameter of the larger outer diameter portion of the igniter collar is substantially the same with the outer diameter of the cylindrical housing.

5. The apparatus according to claim 1,
wherein the upper retention surface is a first inclined circular surface connecting the ignition portion and the larger-diameter portion and the lower retention surface are the second inclined circular surface connecting the lower end of the ignition portion and the larger-diameter portion.

6. The apparatus according to claim 1, wherein the igniter is provided such that an outer circumferential surface of the ignition portion makes contact with an inner circumferential surface of the cylindrical housing.

* * * * *